H. & L. IWAN.
ROTARY CHIMNEY COWL.
No. 11,375. Reissued Oct. 17, 1893.
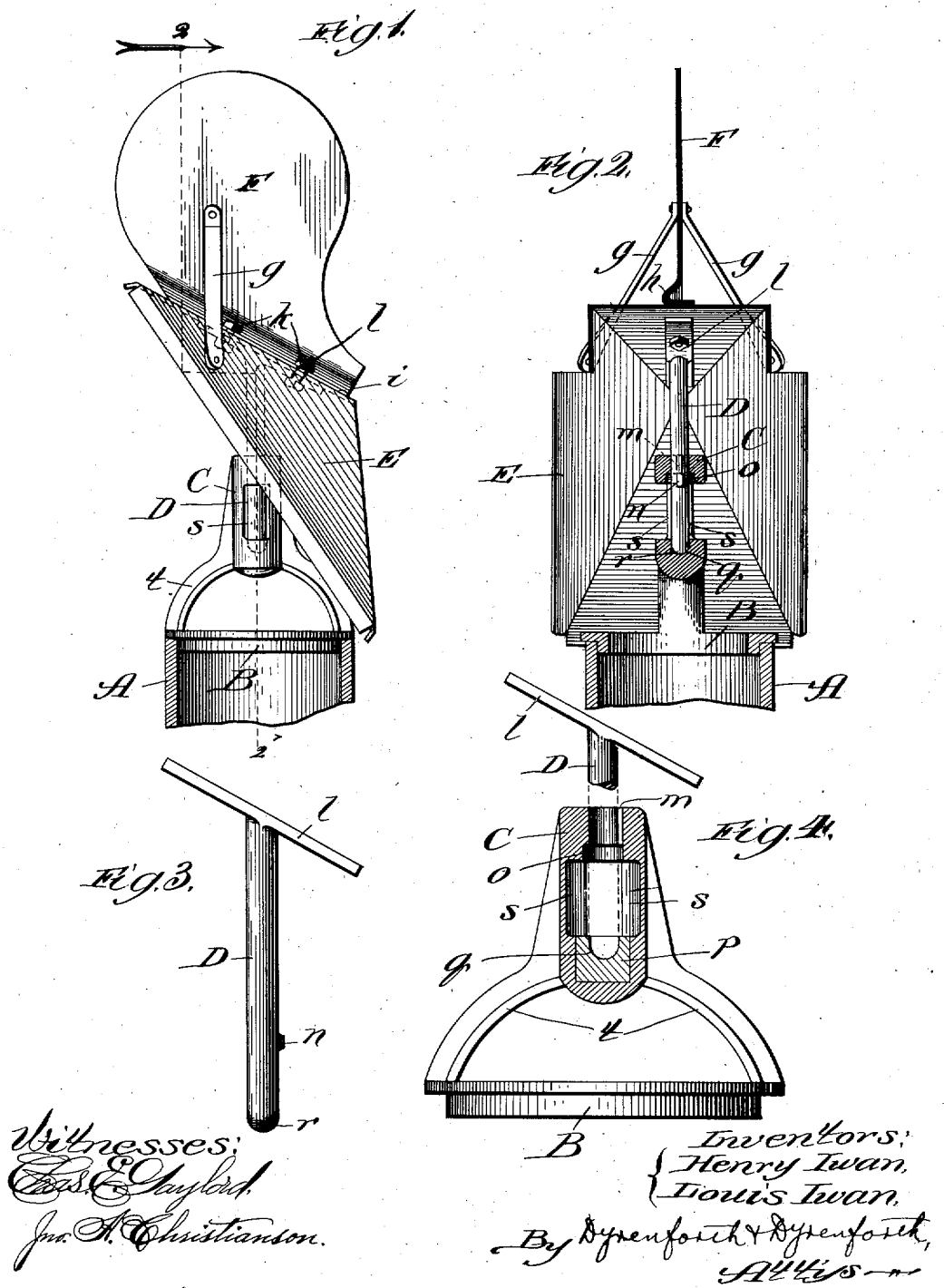
Witnesses:
Chas. E. Gaylord.
Jno. A. Christianson.
Inventors:
Henry Iwan,
Louis Iwan,
By Dyrenforth & Dyrenforth,
Att'ys.

UNITED STATES PATENT OFFICE.

HENRY IWAN AND LOUIS IWAN, OF STREATOR, ILLINOIS.

ROTARY CHIMNEY-COWL.

SPECIFICATION forming part of Reissued Letters Patent No. 11,375, dated October 17, 1893.

Original No. 488,074, dated December 13, 1892. Application for reissue filed April 17, 1893. Serial No. 470,783.

*To all whom it may concern:*

Be it known that we, HENRY IWAN and LOUIS IWAN, citizens of the United States, residing at Streator, in the county of La Salle and State of Illinois, have invented a new and useful Improvement in Rotary Chimney-Cowls, of which the following is a specification Our invention relates to the class of devices which embrace an inclined cowl surmounted by a vane and revolubly mounted upon a support adapted to be fitted to the top of a chimney, whereby the cowl will turn with the direction of the wind and at all times automatically interpose itself as a deflecting-barrier between the air-current and the chimney; and our object is to provide a simple and improved construction for devices of this class.

The nature of our improvements will be clearly understood from the following description, reference being had to the accompanying drawings, in which—

Figure 1 is a side elevation of our device; Fig. 2, a vertical sectional view of the same, taken on the line 2 of Fig. 1 and viewed in the direction of the arrows; Fig. 3, a detached view in elevation of the rotary spindle which supports the cowl and vane; and Fig. 4 a view, partly in elevation and partly in section, of our device with the cowl and vane removed, showing a modification.

A represents the top of the chimney or stack, and B is a flanged rim fitting the top A snugly, so that it may not be displaced by the wind. Cast integral with the rim B or rigidly secured thereto are two arched arms *t*, which converge to a vertical socket C. The lower end of the socket C is closed, and we prefer in the casting to omit interior portions of the opposite sides, as shown at *s*. The diameter of the vertical passage in the socket immediately above the openings *s* is sufficiently reduced in size to form a lateral bearing and support for the spindle, whereas the remainder of the passage for a distance equal to about the length of the openings is of greater diameter, so that no more resistance than possible is offered to the turning of the spindle.

D is a spindle which is inserted into the socket C from the top, and it has its lower end *r* rounded, the lower end of the socket being rounded to correspond, as shown at *q*. As friction in this bearing is liable to be increased by an accumulation of rust, we prefer to insert a glass bearing *p* into the lower end of the socket C, as shown in Fig. 4, and, if desired, it may be secured in place by cement. The exterior form of the glass bearing *p* may be varied, as desired; but its top should be recessed to correspond with the form of the lower end of the spindle D, as shown in the drawings. A stop must be provided to prevent the spindle from being withdrawn from the socket by the action of the wind upon the cowl, which the spindle carries, and for this purpose the socket is recessed out above the opening *s*, as shown at *o*, to form an annular shoulder, beneath which a projection *n* upon the spindle D turns. In the construction shown in the drawings the projection *n* is permanent upon the spindle D in the form of a feather. The upper end of the socket is provided with a groove *m* to receive the pin when the spindle is inserted. This groove terminates at the annular shoulder, so that when the spindle reaches the bottom of the socket there is no impediment to its free rotation. This feature forms a valuable improvement in chimney-cowls, since it permits a damaged cowl to be easily replaced by a new one without the disturbance of anything aside from the cowl and spindle, which are the parts most liable to injury.

Upon the top of the spindle D and rigid with it is an inclined bar *l*, provided with bolt-holes. Upon this bar the inclined cowl E is secured by means of bolts *k*, and the construction is such that the same bolts operate to secure the vane F upon the top of the cowl. This vane consists of an upright plate of sheet metal of substantially the form shown, surmounting the cowl centrally of the latter, and to accommodate the bolts *k* the vane, which is provided with a flange *i* along its lower edge to receive the bolts, is deflected or crimped above the flange, as shown at *h*, to bring the median line of the flange below the plane of the vane. By this construction the vane occupies its proper position, and a single pair of nut-bolts *k* serves to secure together the three parts comprising the spindle, cowl and vane. In addition to this the vane is secured by braces *g*, which are riveted at their upper ends to opposite sides of the vane and at their lower ends to opposite sides of the cowl.

Constructed as above described, our device is simple, durable, and effective, and at the same time offers the smallest possible obstruction to the exit of smoke from the chimney.

What we claim as new, and desire to secure by Letters Patent, is—

1. In a rotary chimney-cowl, the combination of the rim for the upper end of the chimney provided with a bearing extending across it, the cowl, and a spindle and a socket-piece supporting the cowl revolubly upon said bearing, the spindle being provided with a laterally projecting pin, and the socket-piece being provided with an annular retaining shoulder for the pin and with a groove for the passage of the pin to the shoulder, whereby the cowl may be readily placed in position, and is retained there against accidental displacement, substantially as described.

2. In a rotary chimney-cowl, the combination with the spindle carrying the cowl and provided with a feather or pin *n*, of a rim to fit upon the chimney and a socket-piece supported from the rim to form a bearing for the spindle and provided with a vertical groove *m* for the passage of the pin and with a shoulder below the groove, whereby the cowl is readily placed in position and is retained there against displacement by the wind, substantially as described.

3. In a chimney-cowl, a rim having integral converging arms, a cylindrical socket formed integral with said arms, an annular recess *o*, formed in the socket, a groove *m*, leading from the exterior of the socket to the recess, a spindle fitting within and supported by the socket and provided with a feather *n* to enter the groove *m* and adapted to rest beneath the shoulder formed by the recess, in combination with the cowl and vane secured to the spindle, substantially as described.

4. The combination, with the spindle D, having the inclined bar *l*, rigid upon its top and provided with bolt-holes, of the cowl E, vane F, provided with the flange *i* and crimped or deflected above the flange, as shown at *h*, and bolts *k*, securing to the bar *l*, cowl and vane together, substantially as described.

HENRY IWAN.
LOUIS IWAN.

In presence of—
S. A. PERRYMAN,
A. T. DOERMANN.